United States Patent Office.

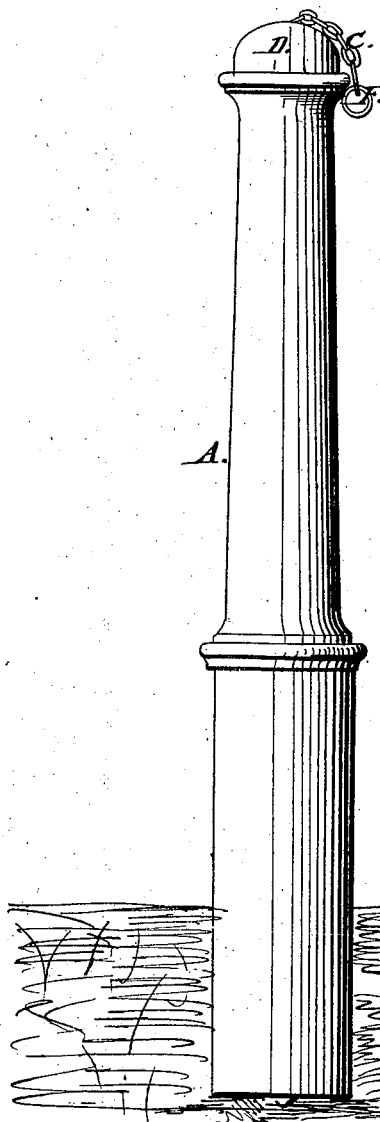
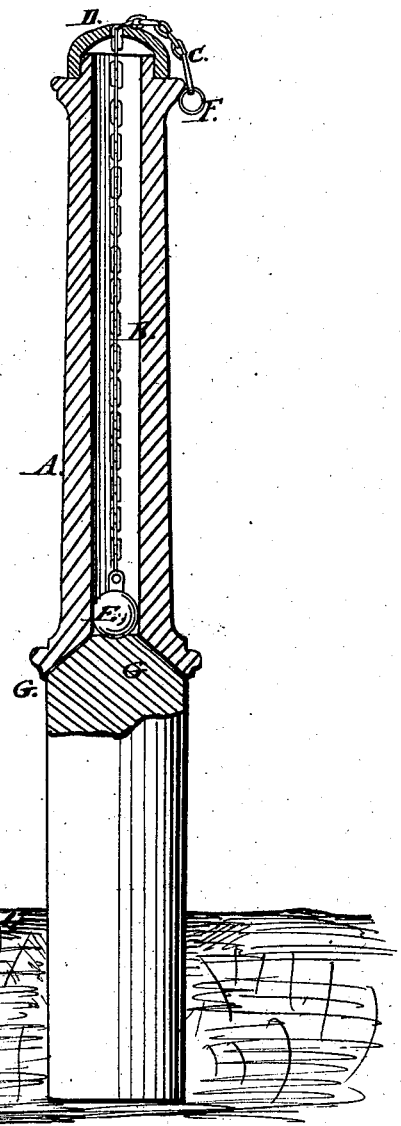

BARTHOLOMEW WALTHER AND PETER WALTHER, OF NEW YORK, N. Y.

*Letters Patent No. 77,686, dated May 5, 1868.*

IMPROVEMENT IN HITCHING-POST.

*The Schedule referred to in these Letters Patent and making part of the same.*

TO ALL WHOM IT MAY CONCERN:

Be it known that we, BARTHOLOMEW WALTHER and PETER WALTHER, of No. 1901 Third avenue, in the city, county, and State of New York, have invented a new and useful Improvement in Hitching-Posts; and we do hereby declare the following to be a full, clear, and exact description thereof, which will enable those skilled in the art to make and use the same, reference being had to the accompanying drawing, forming part of this specification, in which drawing—

Figure 1 is an elevation of a hitching-post made according to our invention.

Figure 2 is an axial section thereof.

This invention relates to apparatus for hitching horses and other animals. It consists in a hollow post, surmounted by a cap, in which is an opening to allow a hitching-rope or chain to reeve through the same; that end of the rope or chain which is inside of the post being weighted sufficiently to take up any slack that may be made outside of the cap or top of the post, such weight serving also as an inside stop to prevent the inner end of the rope or chain from going through the hole in the cap, and becoming thereby detached from the post.

The letter A designates the hollow post, which is set in the ground as far as is necessary to make it secure and firm, or it is secured in any other convenient manner in a stall, or wherever the post is to be used. The upper part of the post is made hollow, as shown at B, for the purpose of receiving the weighted end of the hitching-chain C, which runs out through the top of the post. The top of the post is covered by a cap, D, which is preferably of metal, and which serves both to retain the chain to the post and to protect the upper part of said post, and to cover its cavity B, and prevent the free entrance of dust and dirt and rain. The cap D is made semispherical, or of a convex form, so as to shed rain, and also for the purpose of resisting injury from blows, and its top is perforated to allow the chain C to run or reeve through it. The weight E on the enclosed end of the chain is sufficiently large to prevent it from passing through the hole in the cap or cover D, and also sufficiently heavy to withdraw from the outside to the inside of the post whatever slack is created by the movements of the animal to which the chain is hitched. The outer end of said chain is provided with a ring-stop, F, or with a stop of any suitable construction, which will prevent that end of the chain from falling within the post. The outer extremity of the chain must be provided with a snap-hook, or other suitable fastening, to enable one to attach it to the animal that is to be secured.

It will be observed that this invention will prevent or obviate the common danger of "casting" horses or other animals by means of a slack halter or holding-chain or rope.

The water which collects in cavity B, from the entrance of rain or moisture through the opening in the cap D, is allowed to escape through channels G, two or more, which are made through the walls of the hollow part of the post, so as to intersect the cavity at its bottom; said channels G being made with a downward inclination, as seen in fig. 2. The post can be made of wood or metal, as may be preferred by the maker.

The post may be made, if desired, in sections, and an ordinary "pocket" (so called among mechanics) can be formed at the bottom of the hollow part B, for the purpose of getting at the weight on the chain without the trouble of removing the cap.

We do not claim the invention of a weighted halter, and we disclaim the invention of G. F. Jerome, patented July 26, 1864; but, having thus described our invention,

What we claim as new, and desire to secure by Letters Patent, is—

A hollow hitching-post, A, covered by a perforated metallic cap, and provided with inclined water-escape channels at the bottom of its cavity B, substantially as and for the purpose described.

Subscribed by us, this 9th day of March, 1868, in presence of two witnesses.

BART. WALTHER,
PETER WALTHER.

Witnesses:
W. HAUFF,
J. C. POLLER.